Figure 1:
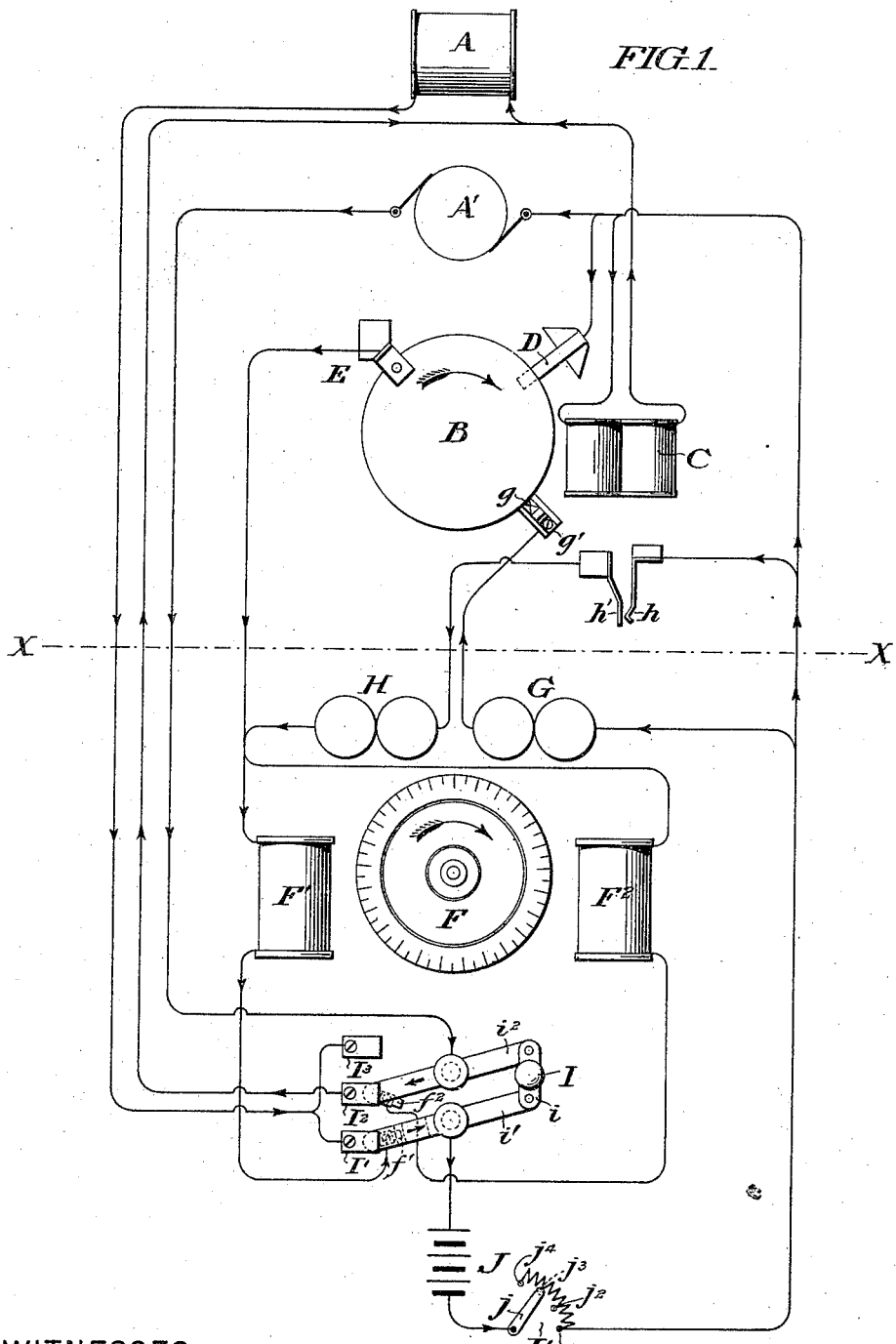

No. 686,073. Patented Nov. 5, 1901.
W. H. HOLLAR & A. L. RHODES.
ELECTRICALLY CONTROLLED COMBINATION LOCK.
(Application filed Mar. 20, 1901.)

(No Model.) 8 Sheets—Sheet 1.

WITNESSES:
Clifton C. Hallowell
Edward Rittenhouse

INVENTORS:
WILLIAM H. HOLLAR,
ALONZO L. RHODES,
by Arthur E. Paige
Atty.

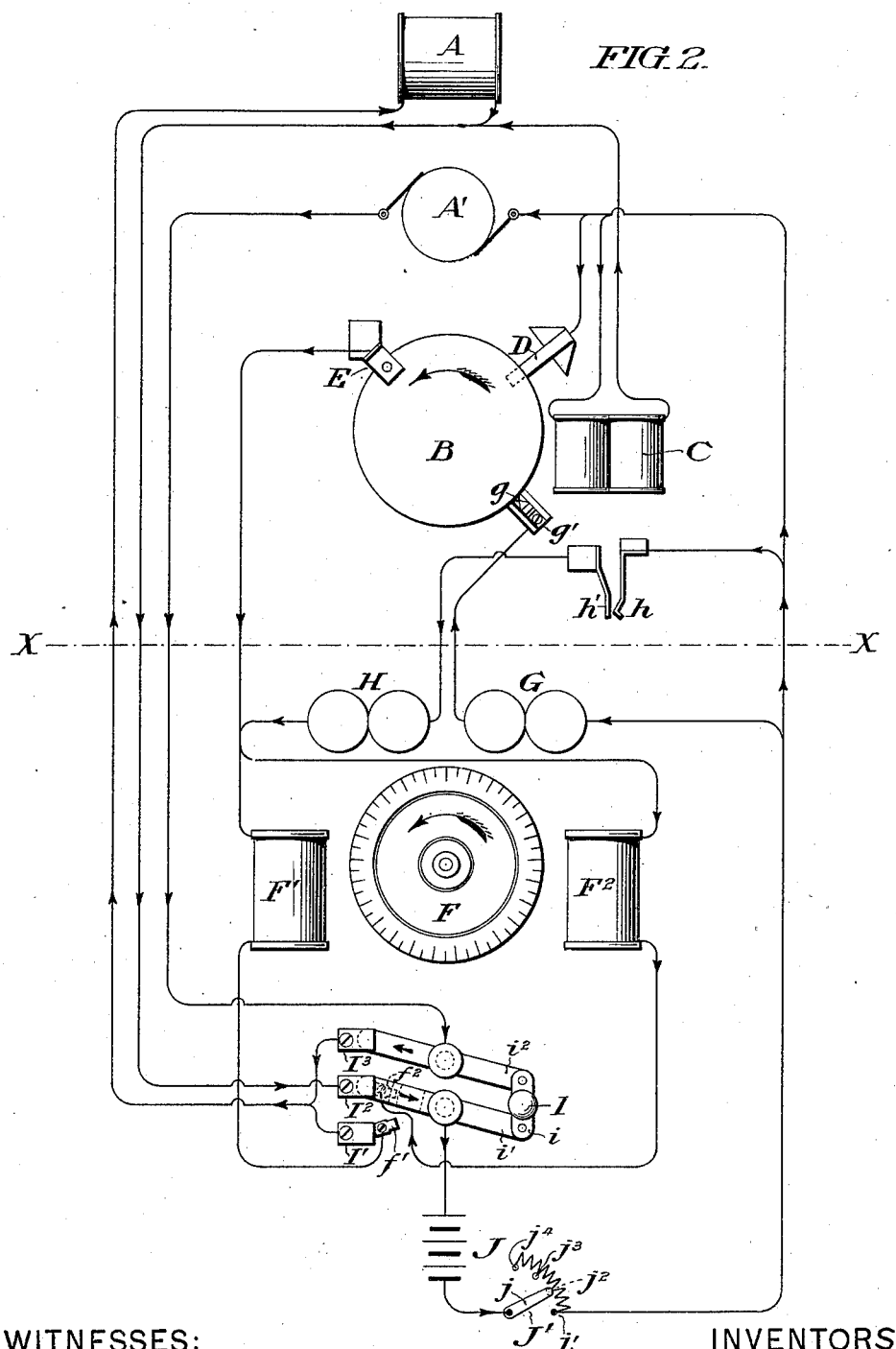

No. 686,073. Patented Nov. 5, 1901.
W. H. HOLLAR & A. L. RHODES.
ELECTRICALLY CONTROLLED COMBINATION LOCK.
(Application filed Mar. 20, 1901.)
(No Model.) 8 Sheets—Sheet 3.
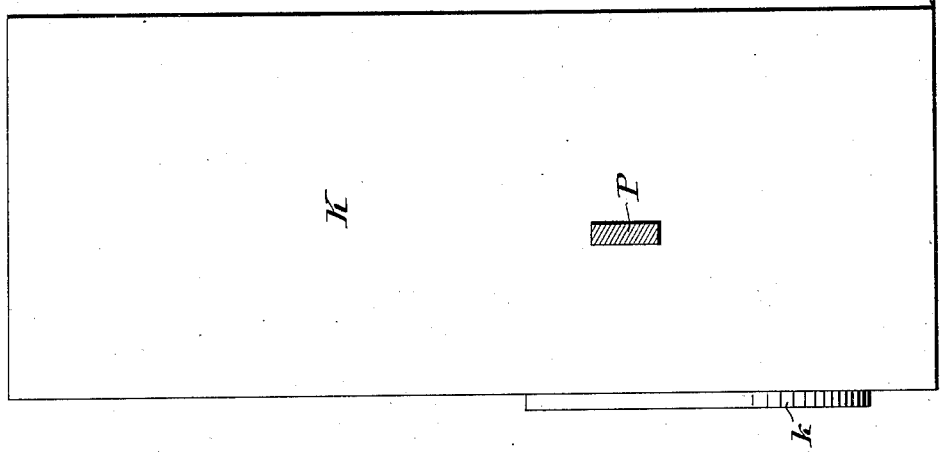
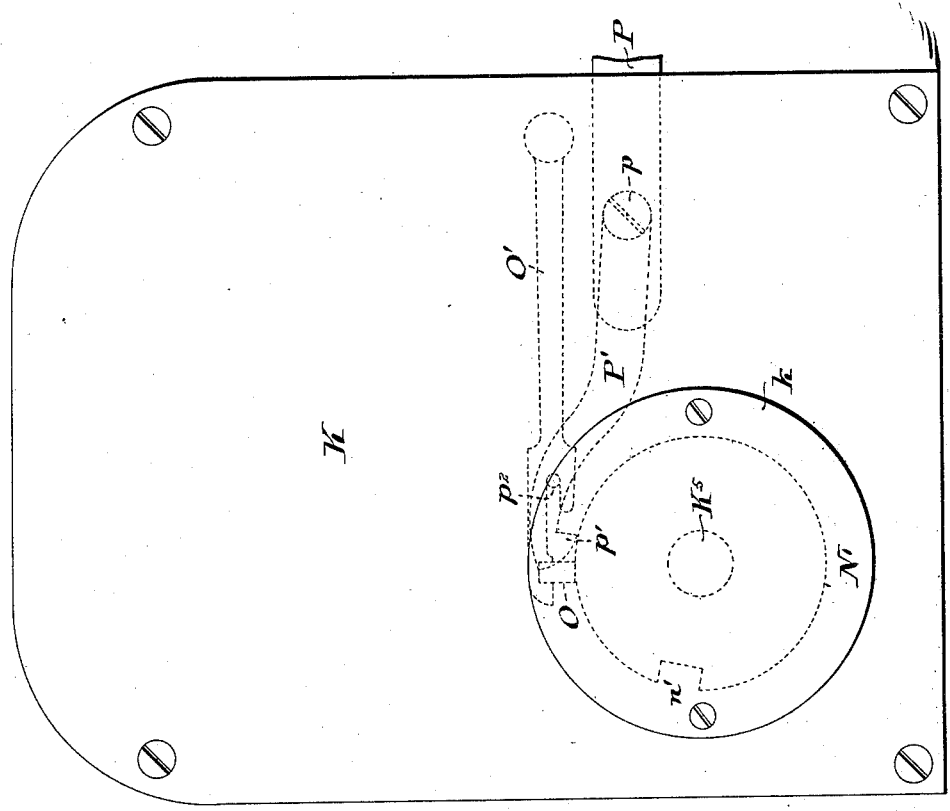
WITNESSES:
Clifton C. Hallowell
Edward Rittenhouse
INVENTORS:
WILLIAM H. HOLLAR,
ALONZO L. RHODES,
by Arthur E. Paige
Atty.

No. 686,073. Patented Nov. 5, 1901.
W. H. HOLLAR & A. L. RHODES.
ELECTRICALLY CONTROLLED COMBINATION LOCK.
(Application filed Mar. 20, 1901.)
(No Model.) 8 Sheets—Sheet 4.
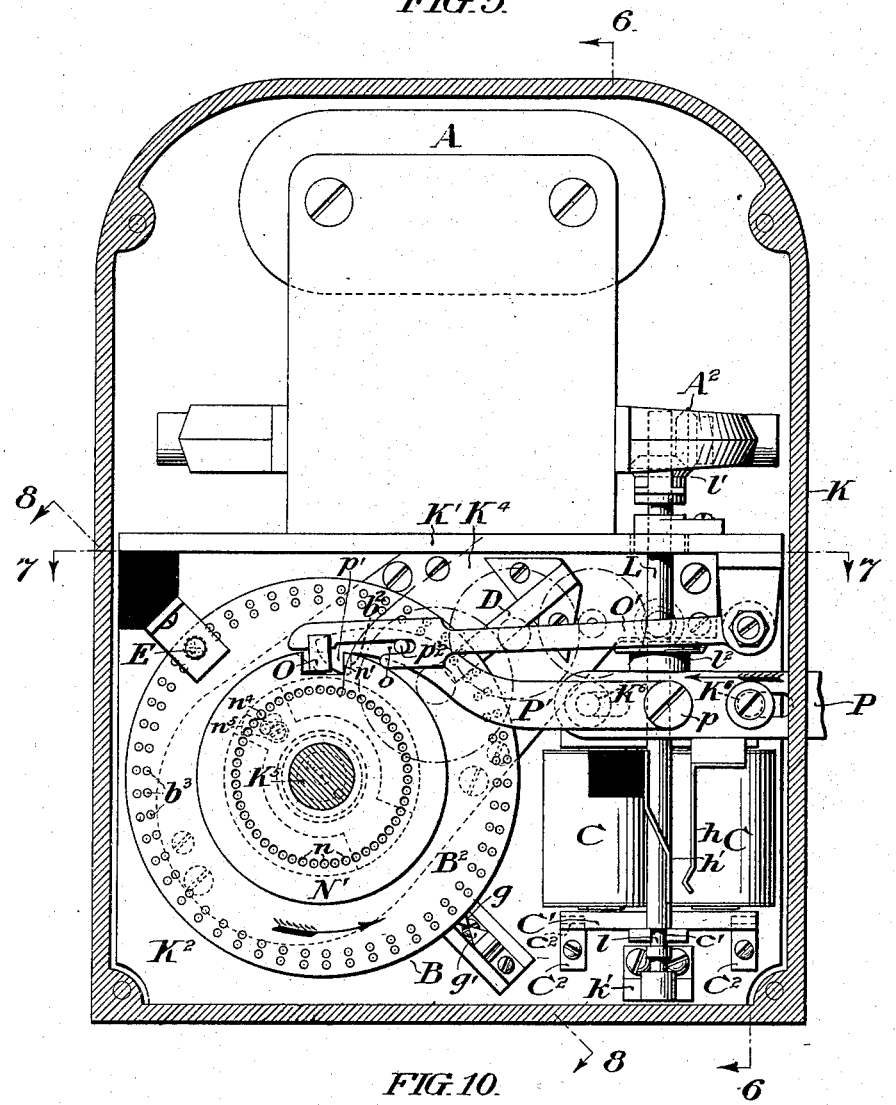
WITNESSES:
Clifton C. Hallowell
Edward Rittenhouse
INVENTORS:
WILLIAM H. HOLLAR,
ALONZO L. RHODES,
by Arthur E. Paige
Atty.

No. 686,073. Patented Nov. 5, 1901.
W. H. HOLLAR & A. L. RHODES.
ELECTRICALLY CONTROLLED COMBINATION LOCK.
(Application filed Mar. 20, 1901.)
(No Model.) 8 Sheets—Sheet 5.
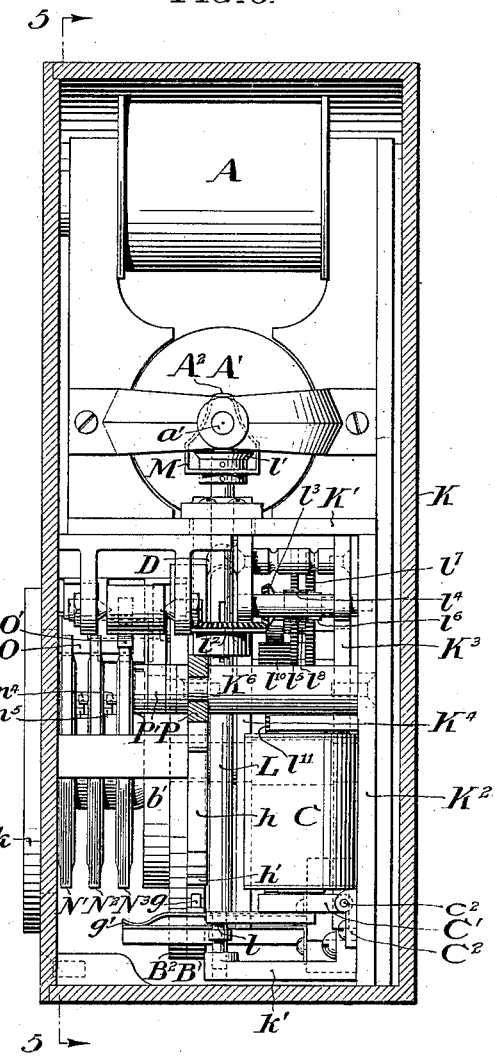
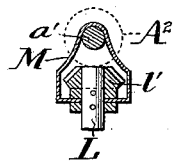
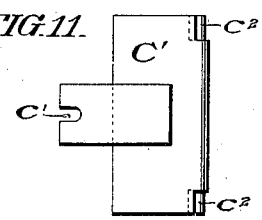
WITNESSES:
Clifton C. Hallowell
Edward Rittenhouse.
INVENTORS:
WILLIAM H. HOLLAR,
ALONZO L. RHODES,
By Arthur E. Paige
Atty.
THE NORRIS PETERS CO., PHOTO-LITHO., WASHINGTON, D. C.

No. 686,073. Patented Nov. 5, 1901.
W. H. HOLLAR & A. L. RHODES.
ELECTRICALLY CONTROLLED COMBINATION LOCK.
(Application filed Mar. 20, 1901.)
(No Model.) 8 Sheets—Sheet 6.
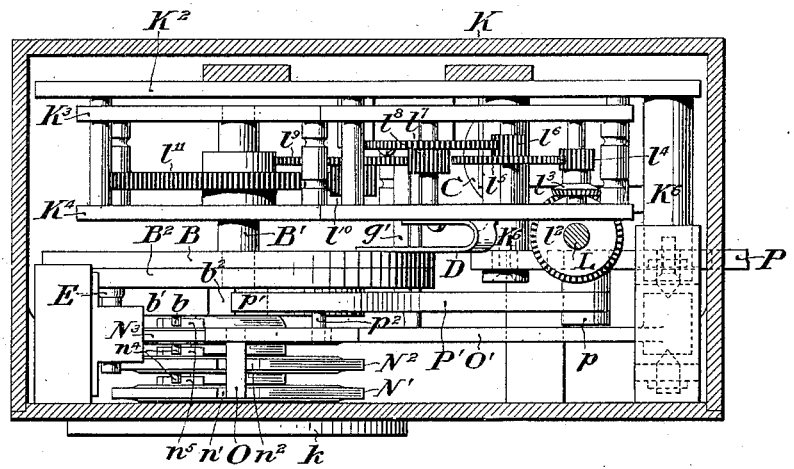
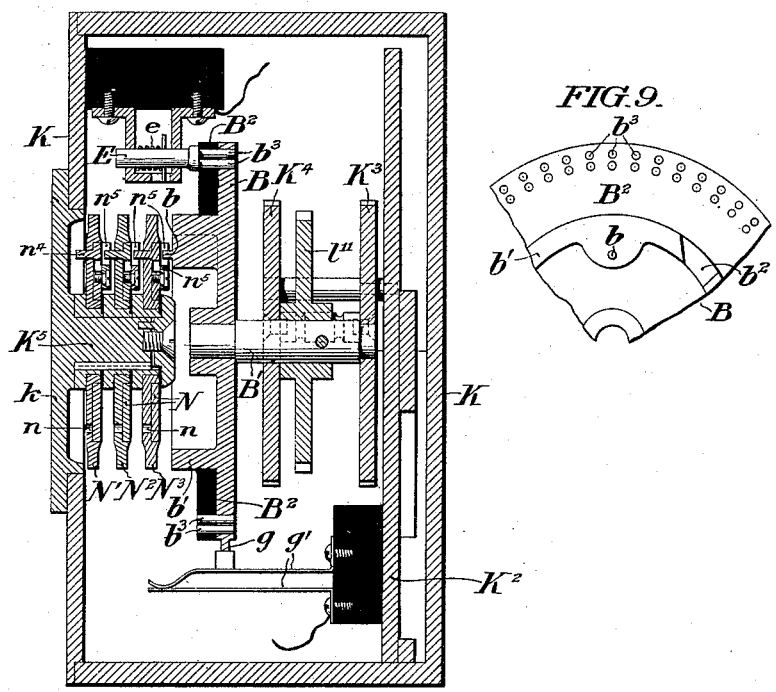
WITNESSES:
Clifton C. Hallowell
Edward Rittenhouse
INVENTORS:
WILLIAM H. HOLLAR,
ALONZO L. RHODES,
by Arthur E. Paige
Atty.

No. 686,073. Patented Nov. 5, 1901.
W. H. HOLLAR & A. L. RHODES.
ELECTRICALLY CONTROLLED COMBINATION LOCK.
(Application filed Mar. 20, 1901.)
(No Model.) 8 Sheets—Sheet 7.
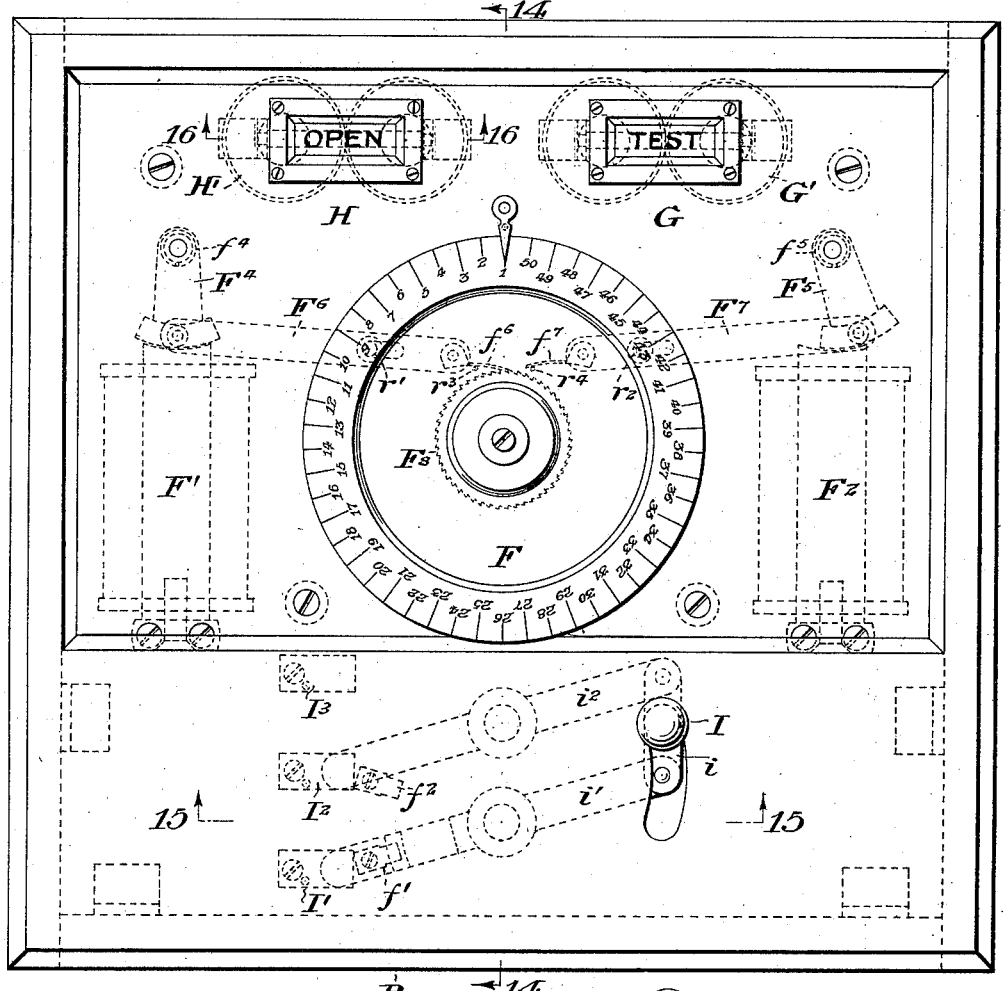
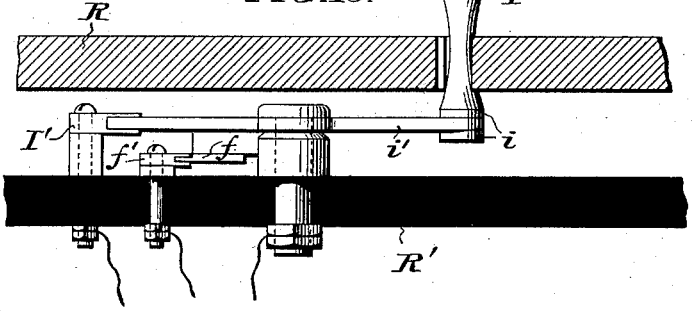
WITNESSES:
Clifton C. Hallowell
Edward Rittenhouse
INVENTORS:
WILLIAM H. HOLLAR,
ALONZO L. RHODES,
By Arthur E. Paige
Atty.

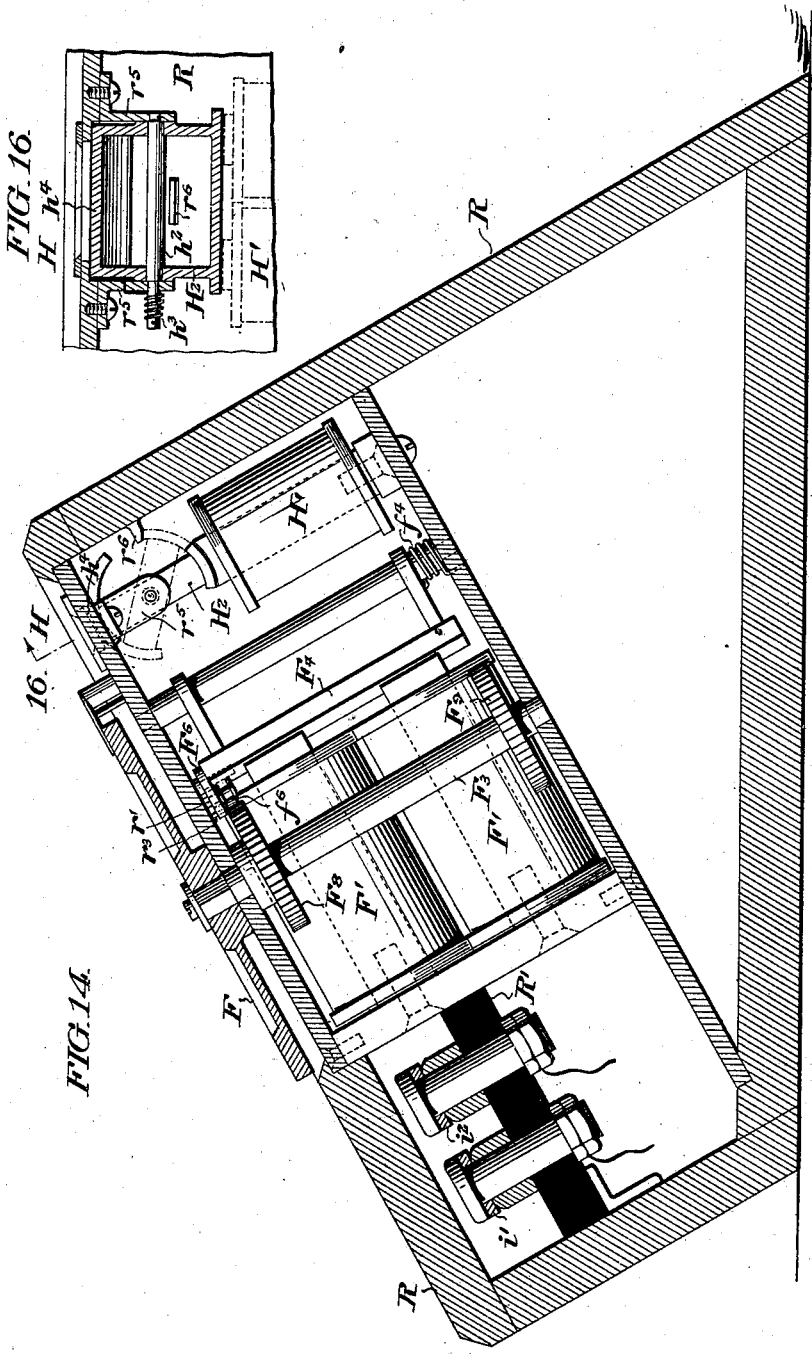

UNITED STATES PATENT OFFICE.

WILLIAM H. HOLLAR AND ALONZO L. RHODES, OF PHILADELPHIA, PENNSYLVANIA; SAID RHODES ASSIGNOR TO SAID HOLLAR.

ELECTRICALLY-CONTROLLED COMBINATION-LOCK.

SPECIFICATION forming part of Letters Patent No. 686,073, dated November 5, 1901.

Application filed March 20, 1901. Serial No. 52,010. (No model.)

*To all whom it may concern:*

Be it known that we, WILLIAM H. HOLLAR and ALONZO L. RHODES, of Philadelphia, in the State of Pennsylvania, have invented certain new and useful Improvements in Electrically-Controlled Combination-Locks, whereof the following is a specification, reference being had to the accompanying drawings.

Our invention relates to locks for safes or vaults wherein the combination or permutation mechanism is associated with a motor arranged to actuate the lock-tumblers and effect the release of the bolt mechanism, said motor being electrically connected with controlling mechanism, whereby the lock may be controlled and actuated by an operator exterior to and remote from the safe or vault in which the lock is employed.

Our invention comprehends certain advantageous features of arrangement and construction hereinafter more definitely specified and claimed.

In the accompanying drawings, Figures 1 and 2 represent, diagrammatically, an arrangement of electrical connections for our invention in respectively different positions of adjustment. Fig. 3 is a front elevation of the lock-casing. Fig. 4 is a side elevation of the lock-casing. Fig. 5 is a vertical sectional view of the lock mechanism, taken on the line 5 5 in Fig. 6. Fig. 6 is a vertical sectional view of said mechanism, taken on the line 6 6 in Fig. 5. Fig. 7 is a horizontal sectional view of said mechanism, taken on the line 7 7 in Fig. 5. Fig. 8 is a diagonal sectional view taken on the line 8 8 in Fig. 5. Fig. 9 is a fragmetary front elevation of the wrist-plate. Fig. 10 is a rear elevation of one of the tumblers. Fig. 11 is a plan view of the armature of the clutch-magnet. Fig. 12 is a fragmentary sectional view of the motor-brake shown in dotted lines in Fig. 6. Fig. 13 is a face view of the casing comprising the controlling and indicating mechanism. Fig. 14 is a sectional view taken on the line 14 14 in Fig. 13. Fig. 15 is a sectional view taken on the line 15 15 in Fig. 13. Fig. 16 is a sectional view taken on the line 16 16 in Figs. 13 and 14.

Referring to Figs. 1 and 2, the parts indicated above the line X X are located within the safe in which the lock is employed, and the remainder of the parts are exterior thereto. A represents the field, and A' the armature, of an electric motor arranged to actuate the lock-tumblers by means of the wrist-plate B, with which it is connected at the will of the operator by means of the clutch-magnet C, as hereinafter described. Said plate B, being supplied with electric current through the brush D, serves to transmit electrical impulses through the brush E, and thereby effects the operation of one or the other of the motors F' F² of the rotary indicator F, as hereinafter described. Said plate B also carries the contact-point $g$, which when registered with the brush $g'$ transmits current to operate the test-indicator G, by which the precise relation of the plate B and indicator F are determined.

The spring-brush $h$ is carried by the detent-bar leading to the bolt mechanism and in the open or released position of the lock contacts with the stationary brush $h'$ and transmits a current to operate the indicator H and manifest such position of the lock.

The controller-handle I is fixed to the link $i$, which physically connects the electrically-insulated switch-levers $i'$ $i^2$, so that said levers may be simultaneously oscillated with respect to the contacts I' I² I³. Normally said levers are located intermediate of said contacts, so that no current is transmitted through the circuits leading from the source of current J. When, however, said controller I is shifted to the position shown in Fig. 1, the motor-armature A' is caused to rotate the wrist-plate B, and the latter effects the rotation of the indicator F in the direction of the arrows marked thereon in Fig. 1. In the reverse position of said controller I (shown in Fig. 2) the wrist-plate B and indicator F are caused to rotate in the reverse direction, as indicated by the arrows marked thereon in Fig. 2, such change in direction of rotation being secured by the reversal of the current-flux through the field-coil A, as indicated by the arrow-heads upon the several conductors.

The branch circuits leading, respectively, through the opposed indicator-motors F' F² terminate in respective contacts $f'$ $f^2$, which are respectively engaged by the brush $f$, fixed upon the lever $i'$, so that in the position of the controller I shown in Fig. 1 the motor F' is connected for operation and the motor $F^2$ is disconnected and idle, and in the position of said controller shown in Fig. 2 the motor F' is disconnected and idle and the motor $F^2$ is connected for operation.

Referring to the detailed views of the mechanism, K is the lock-casing, wherein the lock-motor, comprising the field A and armature A', is supported upon the horizontal frame-plate K'. The shaft $a'$ of said armature A' is provided with the bevel-gear $A^2$, arranged to mesh with the gear $l'$ upon the counter-shaft L, which is mounted for rotation in the frame members K' and $k'$. Said shaft L is arranged to reciprocate through, but is keyed to rotate the bevel-gear $l^2$, which is operatively connected with the driving-spindle B' of the wrist-plate B by the train of gears $l^3$ to $l^{11}$, inclusive. The reduced portion $l$ of the shaft L is engaged by the notch $c'$ in the armature C' of the clutch-magnet C. Said armature is provided with pintles $c^2$, journaled in the brackets $C^2$ upon the frame-plate $K^2$, and the arrangement of the parts is such that when the clutch-magnet C is energized the armature C' is uplifted and the gear $l'$ engaged with the gear $A^2$ upon the armature-shaft $a'$, which places the lock-motor in operative relation with the driving-spindle B'. However, when the electric circuit through the clutch-magnet C is broken said armature C' falls, carrying with it the shaft L and gear $l'$, thus disconnecting the lock-motor from said driving-spindle B'. We also find it convenient to provide the shaft L with the brake-yoke M, (best shown in Fig. 12,) which yoke being in frictional contact with the shaft $a'$, when the shaft L is lowered as aforesaid, serves to check the rotation of the motor-shaft $a'$.

The spindle B', which may be operatively connected and disconnected with respect to the lock-motor, as above described, is journaled in the frame-plates $K^3$ $K^4$ and carries the wrist-plate B, which may be rotated at the will of the operator manipulating the controller I, so as to effect any desired rotary adjustment of the lock-tumblers N' $N^2$ $N^3$, and when said tumblers are set with their respective peripheral notches $n'$ $n^2$ $n^3$ in alinement with the fence O in position to open the lock said wrist-plate may be rotated to shift the detent slide-bar P in the direction of the arrow marked thereon in Fig. 5 to permit or effect the operation of the bolt mechanism, the parts aforesaid being arranged as follows: Said tumblers N' $N^2$ $N^3$ are mounted for independent rotation upon the stud $K^5$, projecting from the plate $k$ conveniently in removable relation with the casing K, and each of said tumblers comprises a circular series of apertures $n$ and a clutch-plate N, carrying a driving-pin $n^4$, whose position with respect to the tumbler-notch may be varied by entering said pin in any selected aperture in the series $n$ when the parts are disassembled. The clutch-plate N of each tumbler is also provided with a pivoted abutment-latch $n^5$, and the relation of the pins and latches is such that by rotation of the wrist-plate B in either direction its pin $b$ encounters the latch of the tumbler $N^3$, and thereby all of the tumblers may be rotated back and forth in accordance with the combination to which they have been set to bring the notches $n'$ $n^2$ $n^3$ of the respective tumblers in alinement, as shown in Fig. 5, in which position the fence O, carried by the lever O', is permitted to fall in said notches. Said fence O extends in opposition to the peripheries of all of the tumblers N' $N^2$ $N^3$, so as to be upheld thereby in the position shown in dotted lines in Fig. 3, except when all of the tumbler-notches $n'$ $n^2$ $n^3$ are rotated to register therewith.

The detent slide-bar P, which is mounted to reciprocate through the side of the casing K upon the supporting-studs $K^6$, is connected in any convenient manner with the bolt mechanism to prevent the operation of the latter when in the position shown in Figs. 3 and 5. The lever P' is pivoted to said bar P at $p$, so that its hooked extremity $p'$ is in the position to register with the recess $h^2$ in the annular flange $b'$ upon the wrist-plate B, so that when engaged therewith rotation of said wrist-plate in the direction of the arrow upon Fig. 5 serves to shift the slide-bar P in the direction of the arrow marked thereon to permit or effect the opening of the bolt mechanism. However, the stud $p^2$ in the lever P' being entered in the slot $o$ of the fence-lever O' the aforesaid releasing movement of the slide-bar P cannot be effected except when the notches $n'$ $n^2$ $n^3$ of the tumblers N' $N^2$ $N^3$ are alined to permit the descent of said lever O' from the position shown in Fig. 3 to that shown in Fig. 5.

As best shown in Fig. 8, the wrist-plate B is provided with a facing $B^2$, of insulating material, through which a circular series of contact-points $b^3$ extend from the body of said plate in position to successively encounter the brush E, which is pressed in electrical connections therewith by the spring $e$. In order to afford the desired area of the contacts $b^3$, we prefer to form the same of radially-alined pairs of pins, as indicated. It is to be understood, however, that each pair of said pins forms, in effect, but a unit in said series, which corresponds with the circular series of apertures in each of the tumblers, comprising fifty units in the form shown. Said wrist-plate B being supplied with current through the brush D, as hereinbefore described, it is to be understood that during its rotation an electrical impulse is transmitted through the brush E with each successive registration of a contact-point therewith. The successive impulses aforesaid are utilized to rotate the dial F of the indicator in accordance with the rotation of said wrist-plate B, as follows: Referring particularly to Figs. 13 to 16, inclusive, said dial F is provided with fifty graduations, corresponding both with the number of apertures in the lock-tumblers and with the number of contact-points $b^3$ upon the wrist-plate B. Said dial F is fixed upon the shaft $F^3$ and mounted for rotation in the casing R between the opposed indicator-motors $F'$ $F^2$. Said motors are respectively provided with oscillatory armatures $F^4$ $F^5$, whose springs $f^4 f^5$ serve to normally swing them outwardly in the position occupied by $F^5$ in Fig. 13. The thrust-bars $F^6 F^7$ are pivoted upon said armatures, supported by studs $r'$ $r^2$, and respectively provided with pawls $f^6 f^7$ at their inner ends, which pawls ride over studs $r^3 r^4$ to engage with the respective ratchet-wheels $F^8 F^9$. Said wheels are fixed upon the indicator-shaft $F^3$ and provided with teeth inclined in opposite directions. As above described, said motors $F'$ $F^2$ are respectively in and out of operation in accordance with the direction of rotation of the wrist-plate B, predetermined by the set of the controller I, and in Fig. 13 the motor $F^2$ is in idle position, with its pawl $f^7$ retracted over the supporting-stud $r^4$, while the motor $F'$ is in operative position, so that the successive electrical impulses transmitted by the contacts $b^3$ of the wrist-plate B energize the coil of said motor $F'$, draw its armature $F^4$ into the position shown in Fig. 13 against the tension of the spring $f^4$ thereof, thrust the pawl $f^6$ against the ratchet-wheel $F^8$, and rotate the dial F one graduation with each impulse.

The indicators G H, which, as above described, respectively manifest the test position of the wrist-plate B, and the open position of the lock being similarly constructed we shall limit the detailed description thereof to the device H. (Shown in section in Fig. 16.) The electromagnet $H'$ is opposed by the armature $H^2$, which is fixed upon the shaft $h^2$, journaled in the brackets $r^5$, fixed to the casing R. Said shaft $h^2$ is provided with the spring $h^3$, which normally maintains the armature in contact with the stop $r^6$, as shown in dotted lines in Fig. 14, in which position of the parts a blank portion of the plate $h^4$ is presented opposite a suitable aperture in the casing R. However, when the lock is opened and the detent-bar P shifted, as above described, the brush $h$ upon the latter impinges upon the contact $h'$, fixed in the casing K. The current is established through the coils $H'$ of the indicator H. The armature $H^2$ thereof is oscillated into the position shown in full lines in Fig. 14, and a portion of the plate $h^4$ is presented to said aperture carrying a suitable symbol, such as the word "Open," indicating the position of the lock.

It is to be understood that when the contact-point $g$, carried by the wrist-plate B, is caused to register with the brush $g'$, fixed in the casing K, the current is established through the coils $G'$ of the indicator G and the latter is caused to manifest a suitable signal, such as the word "Test," (indicated in Fig. 13,) in the manner above described with respect to the indicator H.

We prefer to include in our improvements means whereby the operator may vary the speed of the lock-motor during adjustment of the tumblers in order that the tumblers may be turned at high speed until the desired number is approached, and thereupon the speed be decreased to such a degree as to enable the operator to stop precisely at the number desired. Such an arrangement is advantageous in that it permits a greater average speed of operation than would be attainable if the motor were only capable of running at an invariable rate, for that rate would necessarily be slow enough to enable the operator to stop with precision. As a typical means by which said variation may be effected we have shown in Figs. 1 and 2 a rheostat $J'$ in circuit with the source of current J and comprising the lever $j$ and the terminals $j'$ $j^2 j^3$ $j^4$. As shown in Fig. 1, the lever $j$ is in contact with the terminal $j^3$, and, as shown in Fig. 2, said lever is in contact with the terminal $j^2$. It is to be understood that a variation in the speed of the lock-motor A $A'$, and consequently of the respective indicator-motors $F'$ $F^2$, is consequent upon said adjustment of the rheostat.

In order that the operator manipulating the controller I may conveniently refer to the indicator-dial F, we prefer to mount said controller in the casing R, as shown in Figs. 13 and 14, the various contacts of the controlling group being secured in proper relation in the slab of insulating material $R'$ in fixed relation with said casing R. The rheostat $J'$, above described, being entirely distinct from said controller I is preferably mounted in a separate casing.

The precise form or arrangement of the lock-boltwork is of course immaterial to our present invention, which is addressed to the manipulation of the lock-tumblers and detent. However, it is to be understood that the detent P may merely detain and release a bolt mechanism arranged to be manually operated, as is usual in small structures, or said detent may detain and release an automatic bolt-operating mechanism, such as is ordinarily employed in large structures.

We do not desire to limit ourselves to the precise arrangement or construction of the devices hereinbefore described, as it is obvious that various modifications may be made therein without departing from the essential features of our invention.

We claim—

1. In a lock, the combination with a series of tumblers; of an electric motor rotatable independent of said tumblers; and means to actuate said tumblers by said motor, at the will of the operator, substantially as set forth.

2. In a lock, the combination with a series of tumblers; of an electric motor; and means to operatively connect said motor with said tumblers and to disconnect said motor from said tumblers at the will of the operator, substantially as set forth.

3. In a lock, the combination with a series of tumblers; of a motor in operative relation with said tumblers; an automatic bolt-operating device; a detent for said automatic; and means controlled by said tumblers to connect said motor with said detent and effect the release of the automatic, substantially as set forth.

4. In a lock, the combination with a series of tumblers; of a motor in operative relation with said tumblers; an automatic bolt-operating device; a detent slide-bar for said automatic; a lever pivoted upon said detent-bar, and arranged to be controlled by said tumblers to connect said motor with said detent and effect the release of the automatic, substantially as set forth.

5. In a lock, the combination with a series of disk-tumblers; of a wrist-plate operatively related to said tumblers; a recess in said wrist-plate; a detent slide-bar; a lever pivoted upon said slide-bar and adapted to engage the recess in said wrist-plate; a fence upheld by said tumblers and provided with means to support said lever; and peripheral notches in the respective disks arranged to permit the descent of said fence when in registry therewith, substantially as set forth.

6. In a lock, the combination with a series of tumblers; of a driving-spindle provided with a wrist-plate operatively related to said tumblers; an electric motor comprising an armature-shaft; a gear upon said armature-shaft; a train of gearing extending from said armature-gear to said spindle and comprising means to connect and disconnect said motor and spindle, substantially as set forth.

7. In a lock, the combination with a series of tumblers; of a spindle operatively related to said tumblers; an electric motor; and means to connect said motor with said spindle, comprising an electromagnet, substantially as set forth.

8. In a lock, the combination with a series of tumblers; of a spindle operatively related to said tumblers; an electric motor; and means to connect said motor with said spindle comprising a gear-provided shaft; and an electromagnet arranged to shift said shaft at the will of the operator, substantially as set forth.

9. In a lock, the combination with a series of tumblers; of a spindle operatively related to said tumblers; actuating mechanism for said spindle comprising an electrically-controlled motor; means to connect and disconnect said motor with respect to said spindle; a controlling device distinct from the lock; and electric circuit connections between said controlling device and said motor, substantially as set forth.

10. In a lock, the combination with a series of tumblers; of a spindle operatively related to said tumblers; actuating mechanism for said spindle comprising an electrically-controlled motor; means to connect and disconnect said motor with respect to said spindle; a controlling device distinct from the lock; an indicator distinct from the lock arranged to manifest the rotary position of said disk-spindle; and electric circuit connections between said indicator and said spindle, substantially as set forth.

11. In a lock, the combination with a series of tumblers; of a spindle operatively related to said tumblers; actuating mechanism for said spindle comprising an electrically-controlled motor; means to connect and disconnect said motor with respect to said spindle; a controlling device distinct from the lock; an indicator distinct from said lock and comprising a graduated dial; and means whereby said dial is rotated in definite relation with the rotation of said spindle, comprising electric circuit connections between said indicator and said spindle, substantially as set forth.

12. In a lock, the combination with a series of tumblers; of a spindle operatively related to said tumblers; actuating mechanism for said spindle comprising an electrically-controlled motor; means to connect and disconnect said motor with respect to said spindle; a controlling device distinct from the lock, comprising means to reverse the direction of rotation of said motor; and electric circuit connections between said controlling device and said motor, substantially as set forth.

13. In a lock, the combination with a series of tumblers; of a spindle operatively related to said tumblers; actuating mechanism for said spindle comprising an electrically-controlled motor; means to connect and disconnect said motor with respect to said spindle; an indicator distinct from the lock; an electrically-controlled motor for said indicator; a controlling device distinct from the lock; and means to simultaneously actuate said spindle and said indicator, comprising electric circuit connections between said controlling device, said lock-motor and said indicator-motor, substantially as set forth.

14. In a lock, the combination with a series of tumblers; of a spindle, operatively related to said tumblers; actuating mechanism for said spindle comprising an electrically-controlled motor; a controlling device distinct from the lock; an indicator comprising distinct means arranged to manifest, first, whether said spindle is or is not rotating, second, the rotary position of said spindle, and third, the location of said spindle in a predetermined test position of rotation; and electric circuit connections between said controlling device and said motor, and between said spindle and said indicator, substantially as set forth.

15. In a lock, the combination with a series of tumblers; of a driving-spindle; a wrist-plate upon said spindle operatively related to said tumblers; actuating mechanism for said spindle comprising an electrically-controlled motor; and an indicator arranged to manifest, first, whether said wrist-plate is or is not rotating, and second, the location of a given point upon said wrist-plate in a predetermined test position of rotation, substantially as set forth.

16. In a lock, the combination with a series of rotary tumblers; of a spindle operatively related to said tumblers; an electrically-controlled motor arranged to actuate said spindle; an indicator distinct from the lock, comprising distinct means arranged to manifest, first, whether said spindle is or is not rotating, second, the rotary position of said spindle, third, the location of said spindle in a predetermined test position of rotation, and fourth, whether the lock is in open or closed position; and electric circuit connections between the lock and said indicator, substantially as set forth.

17. In a lock, the combination with a series of tumblers; of a spindle operatively related to said tumblers; means to rotate said spindle in either direction at the will of the operator; an indicator; two opposed motors operatively related to said indicator; and electric circuit connections between said spindle and said indicator-motors comprising means to render one of said indicator-motors operative and the other inoperative in accordance with the direction of rotation of said spindle, substantially as set forth.

18. In a lock, the combination with a series of tumblers; of a driving-spindle provided with a wrist-plate operatively related to said tumblers; a circular series of electric contact-points upon said wrist-plate; a stationary contact-brush arranged to register with said contact-points; an indicator arranged to manifest the successive registry of said contact-points with said brush; and electric circuit connections between said wrist-plate and said indicator, substantially as set forth.

19. In a lock, the combination with a series of tumblers; of a spindle operatively related to said tumblers; an indicator distinct from the lock, comprising distinct means arranged to manifest the rotary position of said spindle and whether the lock is in open or closed position; and electric circuit connections between the lock and said indicator, substantially as set forth.

20. In a lock, the combination with an automatic bolt-operating device; of a detent for said automatic; a series of tumblers; an electric motor; means to actuate said tumblers by said motors at the will of the operator; and means controlled by said tumblers to connect said motor with said detent and effect the release of the automatic, substantially as set forth.

21. In a lock, the combination with a series of tumblers; of a motor; means to operatively connect said motor with said tumblers and to disconnect said motor from said tumblers at the will of the operator; and means to apply a brake to said motor simultaneously with the aforesaid disconnection thereof, substantially as set forth.

22. In a lock, the combination with a series of tumblers; of an electric motor operatively related to said tumblers; and means to vary the speed of actuation of said tumblers by variation in the current supplied to said motor, substantially as set forth.

23. In a lock, the combination with a series of tumblers; of an electric motor; mechanism arranged to operatively connect said tumblers and said motor; and means, independent of said mechanism, arranged to vary the speed of said motor during the operation of said tumblers, at the will of the operator, substantially as set forth.

24. In a lock, the combination with a series of tumblers; of an electric motor operatively related to said tumblers; a controlling device, comprising means arranged to initiate the rotation of said motor; and distinct means arranged to vary the speed of said motor, substantially as set forth.

25. In a lock, the combination with a series of tumblers; of an electric motor operatively related to said tumblers; an indicator-motor whose actuation is consequent upon the actuation of said tumblers by the first motor aforesaid; and means to vary the speed of actuation of said indicator-motor by variation in the current supplied to said first motor, substantially as set forth.

In testimony whereof we have hereunto signed our names, at Philadelphia, Pennsylvania, this 15th day of March, 1901.

WILLIAM H. HOLLAR.
ALONZO L. RHODES.

Witnesses:
ARTHUR E. PAIGE,
LUCIUS S. TYLER.